United States Patent
Brooks

[15] 3,659,914
[45] May 2, 1972

[54] HOLOGRAPHIC SYSTEM WITHOUT LASER SPECKLE

[72] Inventor: Robert E. Brooks, Redondo Beach, Calif.
[73] Assignee: TRW Inc., Redondo Beach, Calif.
[22] Filed: Dec. 17, 1970
[21] Appl. No.: 98,978

[52] U.S. Cl. ...................................350/3.5, 350/162 SF
[51] Int. Cl. ...............................................G02b 27/22
[58] Field of Search ...........................350/3.5, 162 SF

[56] References Cited

OTHER PUBLICATIONS

Gerritsen et al., 7 Applied Optics 2301–2311 (11/1968)

*Primary Examiner*—David Schonberg
*Assistant Examiner*—Robert L. Sherman
*Attorney*—Daniel T. Anderson, Edwin A. Oser and Jerry A. Dinardo

[57] ABSTRACT

A holographic system particularly for holographic interferometry which minimizes the effect of laser speckle yet permits viewing of the holographic image over a wide angular range at discrete angles. The scene beam passes a periodic grating structure, such as a wire mesh screen, a phase grating, or an amplitude grating for breaking up the scene beam into a number of discrete beams corresponding to different orders. The subject is interposed between the grating structure and the hologram. A lens may be arranged between the subject and the hologram for focusing the various discrete scene beams so that a desired number may be selected by an aperture plate. Alternatively, a pair of mirrors may be used for bringing together the discrete scene beams created by the grating structure. A further refinement consists of a second periodic grating structure disposed between the lens and the subject; again, the discrete scene beams may be focused by a lens. The two diffraction gratings preferably have different grating constants. Also, each of the discrete scene beams may be recorded on a separate hologram on which a reference beam is also directed. This may be effected by an additional periodic grating structure for also diffracting a discrete reference beam into the plane of each of the various holograms.

20 Claims, 7 Drawing Figures

Patented May 2, 1972

3,659,914

Robert E. Brooks
INVENTOR.

BY

ATTORNEY

Patented May 2, 1972 3,659,914

Robert E. Brooks
INVENTOR.

BY *Ed. O. Osu.*

ATTORNEY

Patented May 2, 1972 3,659,914

Robert E. Brooks
INVENTOR.

BY

ATTORNEY

HOLOGRAPHIC SYSTEM WITHOUT LASER SPECKLE

BACKGROUND OF THE INVENTION

This invention relates generally to holographic systems, and particularly relates to a system suitable particularly for holographic interferometry which minimizes the effects of laser speckle and permits viewing of the holographic image over a wide angular field at discrete angles.

One of the outstanding and dramatic features of holography is that the subject recorded can be reconstructed over a wide angular range from the same hologram. This is specially advantageous when such a wide angle hologram is used for holographic interferometry. It makes it possible to obtain a number of different interferograms, each being a reconstruction of the original hologram and each corresponding to a different viewing angle. Such wide-angle viewing has been obtained in the past by illuminating the subject with diffused light; that is, by means of a diffusing screen or by using a subject which diffusely reflects the light.

However, the use of diffused light in holography has a major drawback: the random phase of the subject light or scene beam at the plane of the hologram gives rise to an image which is modulated by a granular amplitude pattern, usually called laser speckle, laser granularity, or sometimes worms. The size of the granularity is inversely proportional to the size of the imaging aperture such as a lens or the pupil of the viewer. On the other hand, to obtain depth of field, one usually has to use a small imaging aperture. Accordingly, it will be obvious that freedom from granularity and depth of field of the imaging system or mutually incompatible. This becomes particularly important where the interference fringes of the holographic interferometric reconstruction are located in space, and where it is desired to image sharply on the fringe pattern and on the subject.

The drawbacks of laser speckle have been known for some time and various proposals have been made in the past for eliminating the speckle noise. To this end, the use of a grating has been proposed in a paper by Gerritsen, Hannan, and Ramberg which appears in the November 1968 issue of Applied Optics, Volume 7, No. 11, pages 2,301–2,311. In this paper, it is proposed to provide a holographic system consisting of a grating, a lens, and a transparency so that the diffraction grating is in contact with the lens-transparency combination. The purpose of this arrangement is to increase the amount of redundancy in recording holograms; that is, a plurality of holograms are recorded at the same time and on the same recording medium. The diffraction grating breaks up the light beam into a plurality of discrete beams, each of which is recorded on the same hologram. The lens is not used for separating the discrete scene beams. While the hologram is not at the focal plane of the lens, it is very close.

Various types of gratings have been proposed, such as absorption gratings, phase gratings, and ordinary or diffraction gratings. Also, two-dimensional gratings have been proposed where the grating lines intersect each other at right angles for the purpose of increasing the redundancy of the hologram by providing a two-dimensional set of holograms. It should also be noted that the object in this case is a two-dimensional transparency rather than a three-dimensional real object. Thus, it would not be possible to view the two-dimensional object of the Gerritsen et al. paper at different angles to obtain a three-dimensional aspect of the object.

The hologram obtained in accordance with the Gerritsen et al. paper is reproduced so that all of the separate images are reproduced together. The purpose, of course, is to increase the redundancy and to make the hologram more immune to mechanical damage such as scratches.

Another system for eliminating laser speckle in holographic interferograms has been proposed in a paper by Vest and Sweeney which appears in the October 1970 issue of Applied Optics, Volume 9, No. 10, pages 2,321–2,325. This paper also proposes the use of a phase grating. However, in this case, the discrete subject beams which are created by the grating are not focused near the hologram. This requires a rather large angle between the reference beam and the discrete scene beams simply due to the geometric arrangement. In accordance with the present invention, a relatively small angle between the reference and scene beams may be obtained, as disclosed in the applicant's prior U. S. Pat. No. 3,533,675, which is assigned to the assignee of the present invention.

The Vest et al. paper also proposes to reconstruct the hologram by viewing it through a transforming lens and a filtering aperture. This would tend to screen out all but a particular discrete viewing angle which has originally been recorded on the hologram.

It is accordingly an object of the present invention to provide a holographic system particularly suitable for holographic interferometry which minimizes or substantially eliminates the effects of laser speckle and still permits viewing of the holographic image over a wide angular range at discrete angles.

Another object of the invention is to provide a holographic system of the type referred to where the grating constants of a pair of gratings may be selected in such a manner that the energies of the various compound orders are equal within an order of magnitude over a desired angular range and are spaced so as to minimize overlap of adjacent orders.

A further object of the present invention is to provide a holographic interferometric system of the type referred to which permits to record a number of separate holograms, one for each discrete subject beam.

SUMMARY OF THE INVENTION

A holographic system for performing interferometry in accordance with the present invention minimizes or substantially eliminates the effects of laser speckle. It also permits viewing of the holographic image over a wide angular range at discrete angles. The system comprises a laser for generating a laser beam and means for dividing the laser beam into a reference and a scene beam. Means are also provided for recombining the beams in a predetermined plane. A recording medium, such as a photographic film or plate, or a photochromic material, is provided in the predetermined plane.

Further in accordance with the present invention, a periodic grating structure is disposed in the path of the scene beam and ahead of a non-diffuse subject to be holographed. The grating structure breaks up the scene beam into a number of discrete beams corresponding to different orders. Such a periodic grating structure may consist, for example, of a wire mesh screen, a diffraction grating having ruled parallel lines, a phase grating, or an amplitude grating. Finally, a focusing lens may be disposed in the path of the discrete scene beams between the subject and the recording medium for focusing the various discrete scene beams created by the grating structure. An aperture plate may be disposed between the lens and the recording medium and substantially in the focal plane of the lens. The aperture of the plate is arranged for passing only predetermined orders corresponding to the discrete scene beams. Thus, the scene beam is not diffused.

The novel features that are considered characteristic of this invention are set forth with particularity in the appended claims.

The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
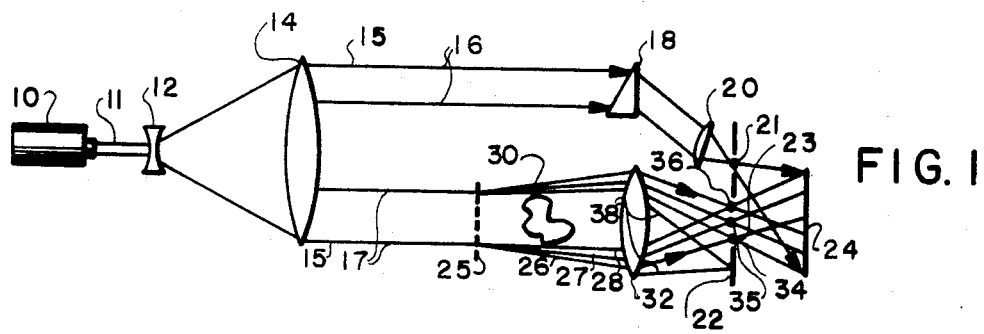
FIG. 1 is a schematic view of a holographic system embodying the present invention and including a periodic grating structure for breaking up the subject beam and a focusing lens for subsequently focusing the discrete subject beams.

Referring now to the drawings, and particularly to FIG. 1, there is illustrated a holographic system embodying the present invention. The system includes a laser 10 for generating a monochromatic and coherent light beam 11. The laser beam 11 may then be enlarged by an enlarging or negative lens 12. The resulting enlarged beam is then collimated by a collimating or positive lens 14, the lenses 12 and 14 forming an inverted Galilean telescope.

The resulting laser beam 15 may now be split or divided into a reference beam 16 and a scene beam 17. As shown in FIG. 1, this may be effected simply by utilizing a portion of the collimated beam 15 as a reference beam 16. The reference beam 16 may now be bent by a prism 18, and may be focused by a focusing lens 20 in a focal point 21 located in the plane of an aperture plate 22 having an aperture 23. The reference beam 16, past its focal point 21, enlarges again to illuminate the plane formed by a recording medium 24 on which the hologram is to be recorded. The recording medium 24 may consist of a photographic film or plate, a photochromic material, or any other suitable light recording substance.

The scene beam 17 passes through a periodic grating structure 25. This structure 25 may consist, for example, of a wire mesh screen, a conventional diffraction screen having ruled parallel lines, a phase grating, or an amplitude grating. Periodic grating structures are well known in the art. A phase grating has the property of changing the effective optical path length of the light passing therethrough in a periodic fashion. This may be effected, for example, by a periodic change of the thickness of the grating or by a change of the refractive index thereof. An amplitude grating is sometimes called an absorption grating and varies periodically the amplitude or intensity of the light wave passing therethrough without changing the phase of the wave. Such an absorption grating may have a two-dimensional, sinusoidally varying amplitude transmission. Diffraction gratings, of course, have long been known and consist of a transparent substance, such as glass, or of a reflecting substance, such as metal, on which a multiplicity of parallel lines are ruled.

The diffracting screen 25 breaks up the scene beam 17 into a plurality of individual and discrete scene beams such as 26, 27 and 28. The scene beam now passes through a subject 30 to be holographed, and thereafter, through a focusing lens 32. Each of the discrete scene beams 26, 27 and 28 is now focused by the lens 32 in the plane of the aperture plate 21 at focal points 34, 35 and 36. These separate images of the subject 30 are then recorded together on the hologram 24. It will be noted that the physical arrangement is such that a small angle between the reference beam 16 and the discrete scene beams 26 – 28 may be maintained. This is desirable because it permits the use of photographic emulsion with low resolution but high light sensitivity. The aperture 23 in the aperture plate 22 is of such a size as to eliminate unwanted scene beams, such as the scene beam 38. Thus, depending on the size of the aperture 23, more or fewer of the discrete scene beams may be recorded on the hologram 24.

It should be noted that the holographic system of the present invention is particularly suitable for performing holographic interferometry. For example, changes in a subject such as 30 which may occur due to applied stress or strain, or due to the movement of expanding gases and the like, may be recorded at two subsequent instants of time on the same hologram. This is the so-called double-exposure holographic technique. Alternatively, the changes of the subject 30 may be viewed by looking at the subject through the hologram 24 whereby interference fringes appear to indicate any changes between the original subject and the subject at a later time. Alternatively, a periodically changing subject may be holographed over a relatively extended period of time to obtain the time average of the motion or vibration whereby nodal and ventral points of the vibration stand out in the reconstructed hologram.

As indicated before, the reference beam preferably is arranged in such a manner that it appears as a point source 21 in the plane of the aperture plate 22. This, of course, makes it possible to locate the reference beam source 21 physically close to the focal points 34 – 36 of the discrete scene beams.

The use of the focusing lens 32 has the advantage that the discrete scene beams are brought together again so that their focal points 34 – 36 are closely adjacent to each other. Furthermore, the lens 32 directs the light toward the hologram 24 so that less of the light is wasted.

Preferably, the aperture plate 22 is at or near the focal plane of the lens 32. The hologram 24 is preferably located behind the focal plane of the lens 32 but is not in the focal plane of the lens.

Figure 2:
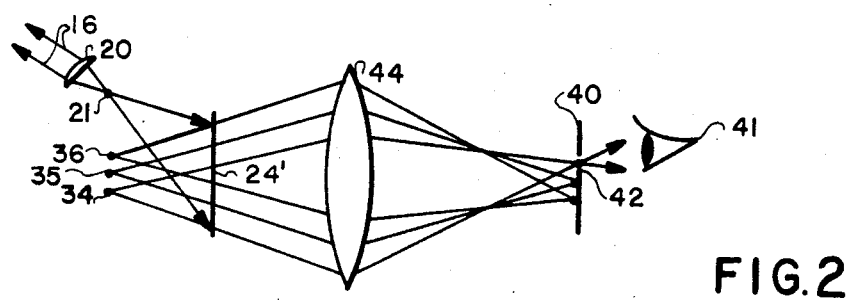
FIG. 2 is a schematic view of a system for reproducing a previously recorded hologram and for selecting a desired one of the recorded discrete subject beams.

It will now be appreciated that a plurality of separate images is recorded on the hologram 24 and that each separate image initially recorded by one of the discrete scene beams may now be separately reconstructed and viewed. This may be effected, for example, by the apparatus of FIG. 2. This shows again the recording medium 24' which is now a developed hologram. It is illuminated again with the reference beam 16 through a focusing lens 20 so that a point reference source 21 is created which illuminates the hologram 24. The conjugate image of the reconstructed hologram may be viewed through an aperture plate 40 by an observer, indicated by the eye 41. The aperture 42 of the aperture plate 40 is such as to select one of the discrete scene beams corresponding, for example, to the focal point 34. Preferably, the image reconstructed from the hologram 24' is focused by a lens 44.

Thus, it will be seen that a plurality of separate holographic images is recorded on the original hologram 24, each of which may now be separately viewed through the aperture plate 40. This system ensures that the holographic image may be viewed over a wide angular range but at discrete angles. On the other hand, the effects of laser speckle have been minimized or substantially eliminated.

Figure 3:
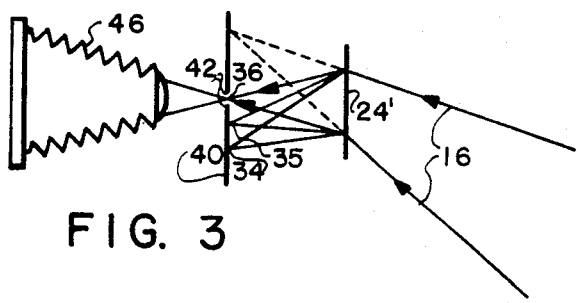
FIG. 3 is a schematic view of another system for reproducing or reconstructing a recorded hologram by means of a camera.

The hologram 24' may also be reproduced as shown in FIG. 3 by a reference beam 16, which is the conjugate of the reference beam, by means of which the hologram was recorded. In this case, the real image is reconstructed at the focal points 34, 35 and 36. By means of the aperture 42 in the aperture plate 40, one of the discrete scene beams may be selected and may now be photographed by a photographic camera 46.

In some cases, the discrete scene beams created by the diffracting screen 25 may have widely separated angles. This, of course, is due to the grating constant of the diffracting screen, where the grating constant is defined as the distance between adjacent lines or other discontinuities which constitute the periodic grating structure. In that case, it may be desirable to re-direct the focal points of the respective discrete scene beams so that they fall together in a plane and closely adjacent to each other. This avoids the necessity of using a large-area photographic plate 24. An apparatus for accomplishing this has been shown in FIG. 4. Here, the original laser beam 15 passes through the diffracting screen 25, then onto the subject 30 and the focusing lens 32. The various discrete scene beams may now be focused by the lens 32 at the points 50, 51 and 52. It will be seen from FIG. 4 that they are widely separated and that a large-area hologram would be required to record them all. On the other hand, it is usually desired to have a relatively small-area hologram 24.

Figure 4:
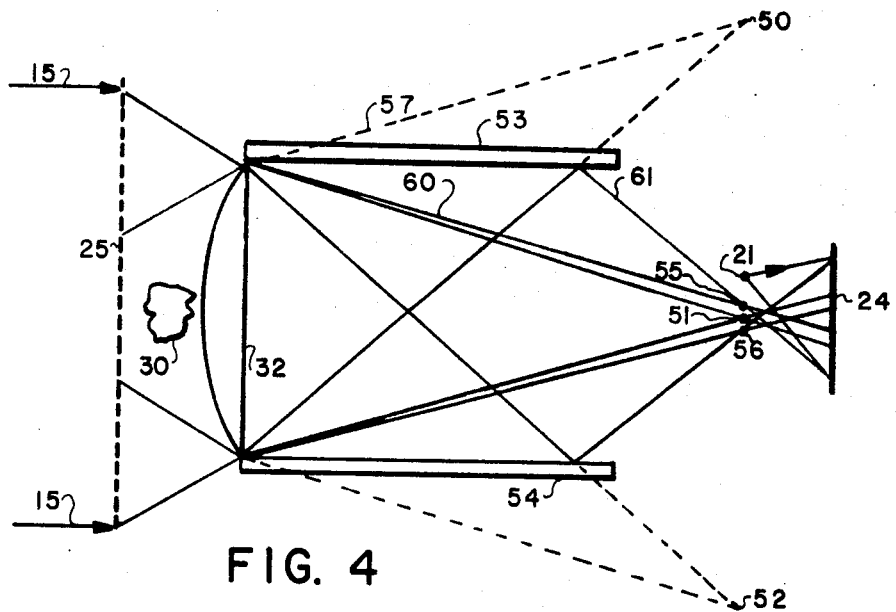
FIG. 4 is a schematic view of a modified embodiment of the present invention including a pair of mirrors for reflecting the scene beams, thereby to bring the focal points of the discrete subject beam within a small area.

Accordingly, in accordance with the present invention, a pair of mirrors 53 and 54 is provided for folding the focal points 50 and 52 by reflection so that they now fall at the points 55 and 56; that is, closely adjacent to each other. For example, FIG. 4 shows that the rays 57 and 58, which are focused at the point 50, are reflected by the mirror 53 to become, respectively, rays 60 and 61 which now intersect at the focal point 55. The same is true of the rays which form the focal point 52.

Accordingly, the focused, discrete scene beams may now be recorded on the hologram 24. A reference beam may have an origin or point source 21 so as to form a small angle between the reference and scene beams at the hologram, thereby reducing the requirement for a high resolution recording medium. For the sake of simplicity, in FIG. 4, neither the laser source nor the means for creating a reference point source 21 have been shown. However, it will be understood that this may be effected by any conventional means; for example, a lens and a pair of mirrors may be used.

It will also be understood that an aperture plate may again be provided in the plane defined by the focal points 51, 55 and 56 to eliminate additional unwanted discrete scene beams.

Figure 5:
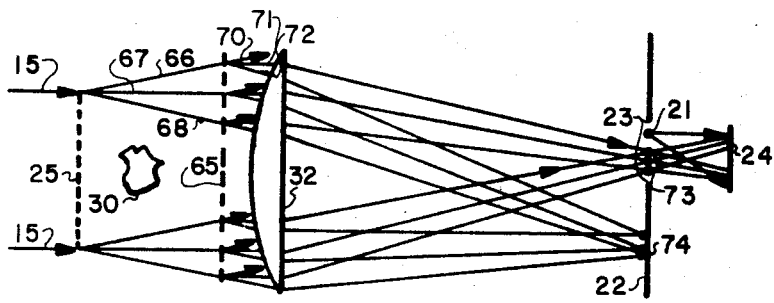
FIG. 5 is a schematic showing of a preferred embodiment of the invention featuring two separate, periodic grating structures.

A preferred embodiment of the present invention is illustrated in FIG. 5, to which reference is now made. Instead of providing only a single periodic grating structure or diffraction grid, there are now provided two such structures or diffraction grids. This permits greater flexibility of the system and permits to control, within certain limits, the angle or separation of the discrete beams and their relative intensities. It is also feasible to control the degeneracy or overlap of the compound orders of the discrete output scene beams.

As shown in FIG. 5, the laser input beam 15 passes through a first periodic grating structure 25, then the subject 30, and a second periodic grating structure 65. As will be subsequently shown, this creates two sets of discrete scene beams which now impinge on the focusing lens 32 which focuses the respective scene beams in a focal plane in or near which the aperture plate 22 is provided so that the aperture 23 selects the desired orders or particular discrete scene beams which it is desired to record. Additionally, the point 21 again indicates the point source of the reference beam which also illuminates the hologram 24.

Thus, the collimated laser beam 15 is split up by the first grating 25 into a plurality of discrete beams such as 66, 67 and 68. Each of these three beams 66, 67 and 68 is again split up or broken up into a plurality of discrete scene beams such as 70, 71 and 72, which, by way of example, are created by the first discrete scene beam 66. One of the second set of discrete scene beams, such as 71, will now be focused by the focal lens 32 in a focal point 73. The same, of course, is true of other sets of discrete beams. Furthermore, there will be one set of focal points, such as 73, within the aperture 23, and a second set of focal points, such as 74, which is disposed a distance from the first set of focal points and therefore is intercepted by the aperture plate 22.

The two periodic grating structures 25 and 65 may again consist of any of the various diffraction gratings previously discussed. It will subsequently be shown that they preferably have different grating constants. The direction of the lines or of the periodicities of the two gratings may be rotated with respect to each other, or else one of the gratings may be tilted with respect to the other.

In general, it might be said that the ratio of the wavelength of the light to the grating constant determines the angles between adjacent beams. For small angles, the angular separation is approximately constant. It can also be shown that, for two diffraction gratings which are assumed to be parallel to each other, the diffraction angles are determined by the ratio of the wavelength to the grating constant, multiplied by an effective or compound order number which depends on the ratio of the two grating constants.

It can also be shown that the energy in the various diffracted orders or compound orders is a function of $A^2 \times B^2$, where A and B are the amplitudes of the phase excursions of the two gratings which vary in a predetermined direction.

Figure 6:
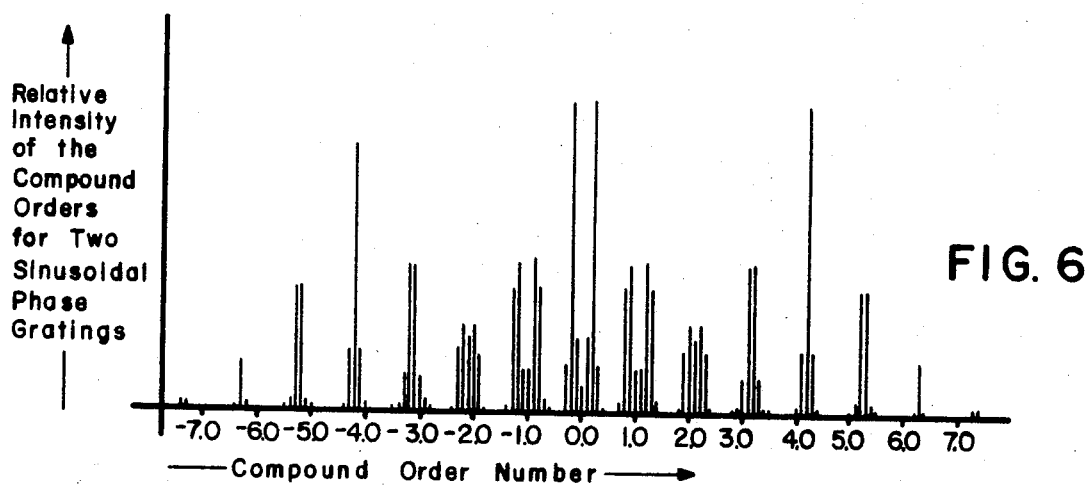
FIG. 6 is a graph showing the relative intensities of various compound orders obtainable with a particular set of two diffraction gratings of the system of FIG. 5.

Thus, FIG. 6 shows, by way of example, the intensity and relative spacings of the compound order numbers of such a double grating. For this example, the values of A and B have each been chosen to be equal to three, while the ratio of the two grating constants has been selected to be 1.1. Thus, the energy in each of the diffracted orders depends on the values of A and B and may be selected for any particular purpose. Rotating one of the gratings with respect to another facilitates separation of the respective orders. If the gratings are made such that they are not simple sinusoidal gratings but have, for example, non-linear exposure versus phase relationship, higher spatial frequency harmonics will result. This, of course, will change the entire distribution of energy among the orders. Accordingly, it will be seen that, by suitably selecting the properties of the two gratings 25 and 65, different desirable results may be obtained.

Figure 7:
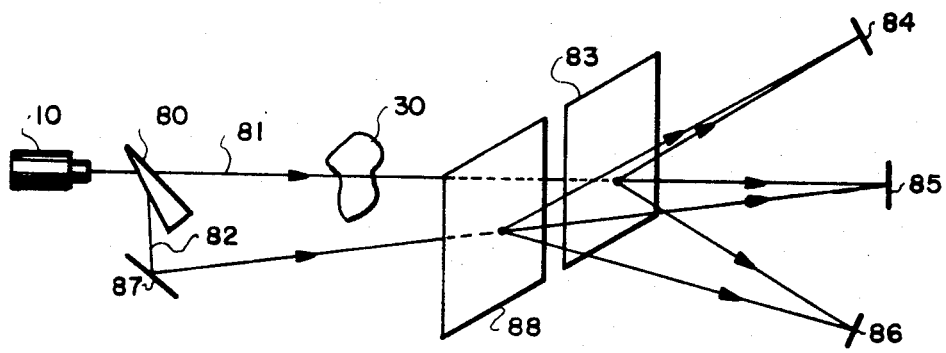
FIG. 7 is a schematic view of still another embodiment of the invention where separate recording media are provided for recording separate scene beams obtained by a first diffraction grating, and where a second diffraction grating is used for also breaking up the reference beam into individual beams.

Still another embodiment of the invention is illustrated in FIG. 7, to which reference is now made. Here, a separate hologram is recorded of each of the individual or discrete scene beams. Thus, the light from a laser 10 falls on a conventional beam splitter 80 to provide a scene beam 81 and a reference beam 82. The scene beam 81 then falls on an object 30 and subsequently on a diffraction grating 83 which splits up the scene beam into say three discrete scene beams which may now be recorded by three recording media 84, 85 and 86. The reference beam 82 is reflected by the mirror 87 and falls on a second diffraction grating 88 which similarly splits up the reference beam into three separate reference beams so that a scene beam and a reference beam impinge on each of the three holograms 84, 85 and 86. In this case, each of the discrete scene beams is recorded on its own hologram, and may be reconstructed therefrom. Since there are separate holograms for each discrete scene beam, there must also be a separate reference beam for each hologram. In FIG. 7, this has been accomplished by the grating 88. Alternatively, the same results may be obtained by using a plurality of successive beam splitters and mirrors to split up the reference beam into a plurality of separate beams, each of which is directed toward the appropriate hologram.

There has thus been disclosed a holographic system particularly suitable for holographic interferometry. It permits to substantially eliminate the effects of laser speckle while still maintaining the three-dimensional aspect of the reconstructed image. This is effected by the use of a single diffraction grating with a focusing lens or else by the use of two diffraction gratings. Alternatively, each of the discrete scene beams which are created by the use of a diffraction grating may be separately recorded on its own hologram. The use of two diffraction gratings lends great flexibility to the system and permits, within limits, to control both the overlap or spatial separation of the orders, as well as their energy distribution.

What is claimed is:

1. A holographic system for performing interferometry and for minimizing the effects of laser speckle and permitting viewing of a holographic image of a three-dimensional subject over a wide angular range at discrete angles, said system comprising:
   a. a laser for generating a laser beam;
   b. means for dividing said laser beam into a reference beam and a scene beam and for recombining said beams in a predetermined plane;
   c. a recording medium disposed in said predetermined plane for recording a hologram;

d. a periodic grating structure disposed in the path of said scene beam and ahead of a three-dimensional subject to be holographed for breaking up said scene beam into a number of discrete beams corresponding to different orders; and e. a focusing lens disposed in the path of said discrete scene beams between the subject and said recording medium for focusing the various discrete scene beams created by said grating structure.

2. A holographic system as defined in claim 1 wherein an aperture plate is disposed between said lens and said recording medium and substantially in the focal plane of said lens for passing only predetermined orders of said discrete scene beams.

3. A holographic system as defined in claim 1 wherein a pair of mirrors is provided substantially between said focusing lens and said recording medium, said mirrors being disposed for reflecting on said recording medium desired discrete scene beams created by said grating structure.

4. A holographic system as defined in claim 1 wherein a second periodic grating structure is disposed in the path of said scene beam between the subject and said lens, said second grating structure providing an additional set of discrete beams which are recombined with the first-named discrete beams at said recording medium.

5. A holographic system as defined in claim 1 wherein said periodic grating structure consists of a wire mesh screen.

6. A holographic system as defined in claim 1 wherein said grating structure consists of a support having ruled parallel lines.

7. A holographic system as defined in claim 1 wherein said grating structure is a phase grating.

8. A holographic system as defined in claim 1 wherein said grating structure is an amplitude grating.

9. A system for performing holographic interferometry and for minimizing the effects of laser speckle, said system permitting viewing of a holographic image of a three-dimensional subject over a wide angular field at discrete angles and comprising:

a. a laser for generating a laser beam;

b. means for dividing said laser beam into a reference beam and a scene beam and for recombining said beams in a predetermined plane;

c. a recording medium disposed in said predetermined plane for recording a hologram;

d. a first periodic grating structure disposed in the path of said scene beam and ahead of a three-dimensional subject to be holographed; and e. a second periodic grating structure disposed in the path of said scene beam and between the subject and said recording medium, each of said grating structures having a different grating constant and breaking up said scene beam into a number of discrete beams corresponding to different orders, said discrete beams being recombined at said recording medium.

10. A holographic system as defined in claim 9 wherein a focusing lens is disposed in the path of said discrete scene beams between said second grating structure and said recording medium for focusing the various discrete scene beams created by said grating structures.

11. A holographic system as defined in claim 10 wherein an aperture plate is disposed between said lens and said recording medium and substantially in the focal plane of said lens for passing only predetermined orders of said discrete scene beams.

12. A holographic system as defined in claim 9 wherein each of said grating structures consists of a wire mesh screen.

13. A holographic system as defined in claim 9 wherein each of said grating structures consists of a diffracting grating having ruled parallel lines.

14. A holographic system as defined in claim 9 wherein the periodic structure of one of said gratings is rotated with respect to that of the other grating.

15. A holographic system as defined in claim 9 wherein one of said grating structures is tilted with respect to the other.

16. A holographic system as defined in claim 9 wherein each of said grating structures is a phase grating.

17. A holographic system as defined in claim 9 wherein each of said grating structures is an amplitude grating.

18. A holographic system for minimizing the effects of laser speckle and for permitting viewing of the holographic image of a three-dimensional subject at different discrete, widely separated angles, said system comprising:

a. a laser for generating a laser beam;

b. means for splitting said laser beam into a reference beam and a scene beam;

c. a first periodic grating structure disposed in the path of said scene beam and ahead of a three-dimensional subject to be holographed for breaking up said scene beam into a number of discrete scene beams;

d. means for directing said reference beam into the path of each of said discrete scene beams; and e. a plurality of recording media, each being disposed in a predetermined plane and in the path of one of said discrete scene beams and one of said reference beams, whereby each of said recording media may be reconstructed to view the subject at a different discrete angle.

19. A holographic system as defined in claim 18 wherein said means for directing said reference beam consists of an additional periodic grating structure disposed in the path of said reference beam and for breaking up said reference beam into a number of discrete reference beams, each being directed into the path of one of said discrete scene beams.

20. A holographic system for performing interferometry and for minimizing the effects of laser speckle and permitting viewing of a holographic image of a three-dimensional subject over a wide angular range at discrete angles, said system comprising:

a. a laser for generating a laser beam;

b. means for dividing said laser beam into a reference beam and a scene beam and for recombining said beams in a predetermined plane;

c. a recording medium disposed in said predetermined plane for recording a hologram;

d. a periodic grating structure disposed in the path of said scene beam and ahead of a three-dimensional subject to be holographed for breaking up said scene beam into a number of discrete beams corresponding to different orders;

e. means for developing the exposed recording medium to provide a hologram and for repositioning it; and f. means for illuminating said hologram with a reference beam and for permitting viewing of one of the reconstructed discrete scene beams.

* * * * *